(12) United States Patent
Deskins

(10) Patent No.: US 6,475,383 B2
(45) Date of Patent: *Nov. 5, 2002

(54) ROTATING CHEMICAL DISTRIBUTION CLEANING SYSTEM FOR WEIRS

(76) Inventor: Franklin D. Deskins, 23 Fairway Dr., Alexandria, IN (US) 46001

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/757,572
(22) Filed: Jan. 11, 2001

(65) Prior Publication Data
US 2001/0040129 A1 Nov. 15, 2001

Related U.S. Application Data
(60) Provisional application No. 60/188,202, filed on Mar. 10, 2000, and provisional application No. 60/175,907, filed on Jan. 13, 2000.

(51) Int. Cl.$^7$ .............................................. B01D 21/24
(52) U.S. Cl. ........................ 210/209; 210/520; 210/528; 210/541
(58) Field of Search ................................ 210/207, 209, 210/520, 525, 528, 541

(56) References Cited

U.S. PATENT DOCUMENTS

| | | | | |
|---|---|---|---|---|
| 3,857,788 A | * | 12/1974 | Smith | 210/520 |
| 4,830,748 A | * | 5/1989 | Hall | 210/541 |
| 4,876,010 A | * | 10/1989 | Riddle | 210/528 |
| 5,089,118 A | * | 2/1992 | Mahoney | 210/541 |
| 5,269,928 A | * | 12/1993 | Leikam | 210/528 |
| 5,720,890 A | * | 2/1998 | Caliva | 210/528 |
| 6,022,475 A | * | 2/2000 | Thomas, III | 210/541 |

OTHER PUBLICATIONS

Prior Art Statements of Jim Patterson and Trent Johnson, Oct. 2001.

* cited by examiner

Primary Examiner—Christopher Upton
(74) Attorney, Agent, or Firm—Fisher, Christen & Sabol

(57) ABSTRACT

A means for controlling/eliminating algae or other biological growth in the weir of a clarifier of waste water.

7 Claims, 3 Drawing Sheets

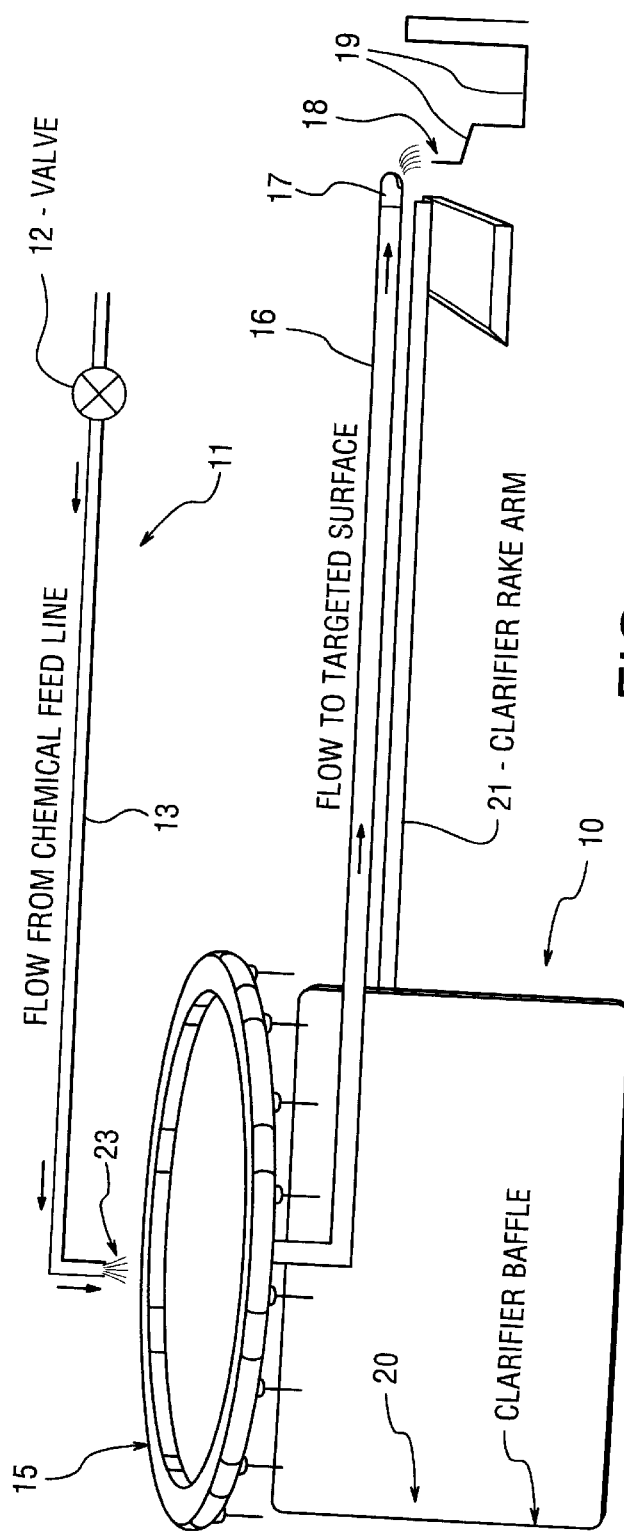
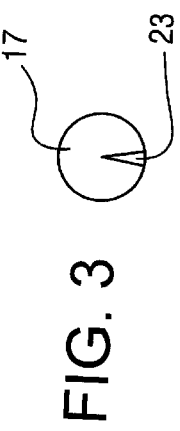
FIG. 2
FIG. 3

ROTATING CHEMICAL DISTRIBUTION CLEANING SYSTEM FOR WEIRS

This utility application has benefit of U.S. Provisional Application Ser. No. 60/175,907, filed on Jan. 13, 2000, and U.S. Provisional Application Ser. No. 60/188,202, filed on Mar. 10, 2000.

BACKGROUND OF THE INVENTION

1. Field Of The Invention

The invention relates to means for controlling algae and other biological growth in the weir of a clarifier of waste water system.

2. Background Art

Sewage systems are physical systems for the collection of waste water and its treatment before discharge back into the environment. Domestic waste water includes the used water of businesses, office buildings and dwellings.

Chlorine and its compounds (e.g., calcium hypochlorite) are extensively used for disinfecting municipal and other domestic water supplies.

Common treatment facilities for treatment of raw waste (sewage) water from a pumping system has the successive steps of grit removal, preliminary sedimentation, final sedimentation and sludge treatment. Sometimes between the sedimentation steps an aeration step is used. Chlorine treatment to the flow prior to the preliminary sedimentation is often used to minimize odors from the sedimentation tanks. Chlorine treatment of the final effluent from the final sedimentation tank is also often used to disinfect the final effluent.

The purpose of the preliminary and final sedimentation tanks is to separate solids (sludge) from the waste water. Sedimentation tanks often are single-compartment thickeners or clarifiers, typically Dorr clarifiers of which there are two main types, namely, circular and square. The two main types of Dorr clarifiers have certain common and essential features, namely: a shallow symmetrical concrete tank; provision for introducing the feed, overflowing the clarified liquor, and discharging the thickened sludge; and a motor-driven revolving mechanism for sweeping the settled solids to a central discharge hopper in the bottom of the tank. Positive removal of sludge is effected by a diaphragm, plunger or other types of pumps. Skimming devices can be furnished, if desired, for continuously removing scum and other light material that tends to float on the surface.

With the Dorr clarifier installed in circular tanks, feed enters centrally below the water level through suitable connections, terminating in a slotted cylindrical diffuser. The central column, supporting the revolving mechanism, and the central drum form a conduit for the influent. The feed leaves the central drum in a radial direction through slots. The head of water above the slots and the circular baffle have the effect of tapering the velocity of flow and giving quiescent feed conditions. Distribution continues throughout the tank on the same radial diverging lines. The rates of diffusion is gradually decelerated as the circle of propagation increases, so that the velocity reaches the absolute minimum as the flow approaches the side of the tank. A continuous annular trough with a continuous weir on its inboard side extends around the complete periphery of the tank. This gives maximum trough and weir length for any tank of equivalent capacity and assures minimum velocity of flow at the point of take-off. A circular scum baffle may be provided just inside the weir. The clarifier mechanism consists of two radial trussed arms, driven by a motor on the stationary central column, and equipped with plough blades that just clear the bottom and sweep settled solids to the central discharge hopper in the bottom. The rake arms are attached to a central drum, concentric with the central column. Sludge is removed continuously by a diaphragm pump. Where scum and floating solids tend to accumulate on the surface of the tank, positive mechanical means are provided for its removal.

The Dorr clarifier installed in square sedimentation tanks follows closely the arrangement of the Dorr circular-tank clarifier with the exception that the tank is square, not round, and one of the rigid arms of the clarifier mechanism is equipped with a special corner blade that reaches out into the four corners of the tank and moves the settled sludge in to the point where it may be picked up by the regular mechanism. The action of the corner blade is positive and controlled automatically. Every square foot of the tank bottom is swept at each revolution of the mechanism. Feed enters centrally through suitable connections, is distributed radially by a submerged diffuser, and is collected peripherally across a continuous weir extending around the four sides of the tank. Two radial arms with plow blades attached are secured to a central revolving drum and are driven by a gear motor mounted on top of the center pier. These revolving rake arms sweep the area of a circle inscribed within the square bottom of the tank. A diaphragm or plunger pump is used for sludge removal and for control purposes. Scum-skimming devices of several different types are supplied to meet different conditions.

It is an ongoing problem to rid the weirs and outfall surfaces of clarifiers for waste water of algae or other biological growth that build up on these areas due to normal usage. The most used methods of removing these algae include taking the unit out of service to stop flow while being cleaned. This act limits the capacity of the treatment facility while hand dispersing calcium hypochlorite to the surfaces and scrubbing clean with a wire or Teflon bristled brush. This prior art method requires numerous man hours of labor intensive effort while being exposed to the effects of calcium hypochlorite.

BRIEF DESCRIPTION OF THE DRAWINGS

In the drawings:

FIG. 2 is a side view of the embodiment of FIG. 1;

FIG. 3 is a view of the split flow diverter; and

DETAILED DESCRIPTION OF THE DRAWINGS AND THE INVENTION

Figure 1:
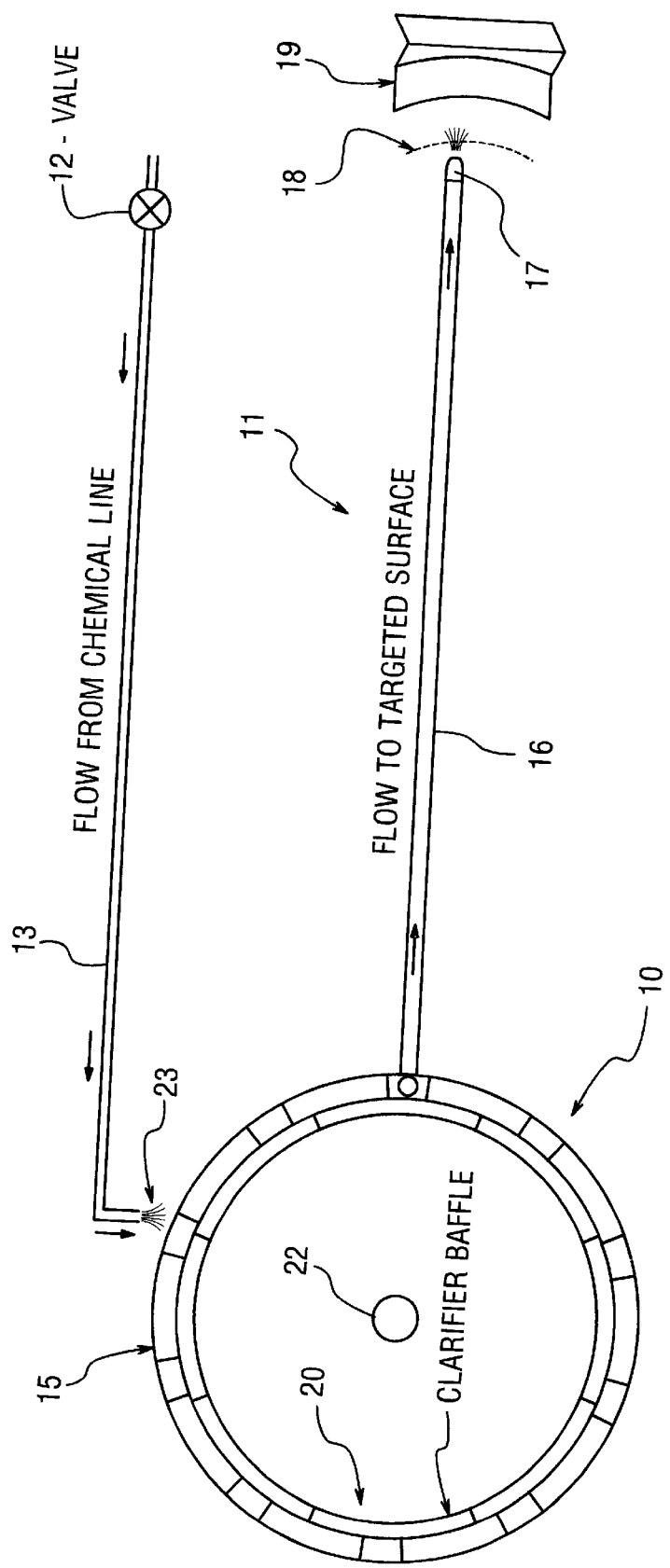
FIG. 1 is a top view of a waste water clarifier containing an embodiment of the rotating chemical distribution cleaning system of the invention.

The rotating chemical distribution cleaning system solves the above described prior art by dispersing a disinfecting chemical solution, such as chlorine, to the weir and outfall structures of a clarifier, used in the treatment of waste water. It is an ongoing problem to rid the weirs and outfall surfaces of algae or other biological growth that build up on these areas due to normal usage. A widely used method of removing these algae involves taking the unit out of service to stop flow while being cleaned. This act limits the capacity of the treatment facility while hand dispersing calcium hypochlorite to the surfaces and scrubbing clean with a wire or Teflon bristled brush. This prior art method requires numerous man hours of labor intensive effort while being exposed to the effects of calcium hypochlorite. The rotating chemical distribution cleaning system of the invention allows a constant online cleaning of the affected surfaces of algae or other biological growth and other substances without the labor and chemical exposure required in the above described prior art method. By utilizing the disinfecting solution referred to as predisinfection as the solution dispersed with this piece of equipment, the cost of calcium hypochlorite is eliminated without any added cost to the disinfection process being used. The invention system allows the facility operator the ability to reroute the disinfecting solution to the areas in need of treatment.

The invention system can be used with preliminary and final sedimentation tanks.

Chlorine is toxic gas at room temperature and pressure. Therefore, the chlorine is used in the invention in aqueous solution where it is present as the chloride ion $Cl^-$. The concentration of the chlorine (or chlorine compound or other chemical suitable for controlling/preventing algae or other biological growth) in the aqueous solution is that which is effective in controlling/preventing algae growth (and disinfecting the effluent from the clarifier).

The rotating chemical distribution cleaning system of the invention is constructed most advantageously of one inch to twelve inch PVC, stainless steel or painted steel pipe and proper fittings attached together to form a circle and cut in half to form a trough. Proper fittings and structure material lengths are used to form the circular trough ring approximately the size of the existing clarifier baffle ring for mounting purposes. There are various ways this piece of equipment may be mounted, such as, being supported by braces extending from the rotating clarifier drive unit shaft, or supports from the existing rotating clarifier baffle. The clarifier is equipped with a rotating scum rake arm which is a standard part of the clarifier system. This arm is used to support the distribution line by various types of supports from the trough ring to the distribution point.

The disinfecting solution is piped from the existing line being used and carried to the trough ring by the chemical feed line which is equipped with a valve to adjust adequate flow. Any excess flow is diverted to the previous point of disinfection before the rotating chemical distribution cleaning system of the invention was installed. Adjusted flow from one chemical feed line is diverted to flow into the trough ring via the air gap or by water to water injection. The trough ring receives flow from the stationary chemical feed line while being allowed to rotate as the existing structure components rotate. The flow has one (or more) outlet point from the trough ring which is advantageously a four inch by four inch by two inch tee fitting diverting the flow downward then turn to a 90 degree angle and is run along the rotating clarifier rake arm by a section of advantageously two inch PVC, stainless steel or steel pipe termed as the chemical distribution line. The length of the chemical distribution line is dependent upon the diameter of the clarifier unit. The point of disbursement is located at the end of the chemical distribution line. Advantageously a two inch PVC, stainless steel or steel cap is installed with an inverted V-cut on the underneath side to allow the disinfecting solution to fan across the surface areas needing treatment.

A first embodiment of the rotating chemical distribution cleaning system 11 is shown in FIGS. 1 to 3. Existing clarifier 10 for waste (sewage) water can be, for example, a Dorr clarifier (partially shown) installed in a circular tank. Clarifier baffle 20 is mounted on clarifier drive shaft 22. Trough ring 15 is mounted on the top edge of clarifier baffle 20. Aqueous chlorine solution is passed from an aqueous chlorine solution source (not shown) through chemical solution feed line 1 with the flow being controlled by valve 12. The discharge end of feed line 13 is located above rotating trough ring 15 with air gap 23. (In FIG. 1, feed line 13 is offset by 90 degrees only for better viewing and understanding.) As seen in FIG. 2, chemical discharge line 16 is mounted on top of clarifier rake arm 21, which is mounted on the side of rotatable clarifier baffle 20. Discharge line 16 has an entrance on the bottom of rotating trough ring 15. The chlorine solution exits through an inverted-V-slot 23 on the underside 17 of end of discharge line 16 (see FIG. 3) into existing clarifier weir 18 (and down the inside wall of the clarifier tank wall). V-slot 23 also fans out the chlorine solution so that it further discharges onto existing clarifier fallout surface 18. In this manner algae or other biological growth is eliminated and its growth prevented in clarifier weir 18 and clarifier fallout surface 19. The treated waste water exits from weir 18 and fallout surface 19 via an effluent pipe (not shown). The chlorine solution addition at weir 18 and fallout surface also disinfects the effluent so that a separate chlorine solution addition to the effluent is no longer required.

Figure 4:
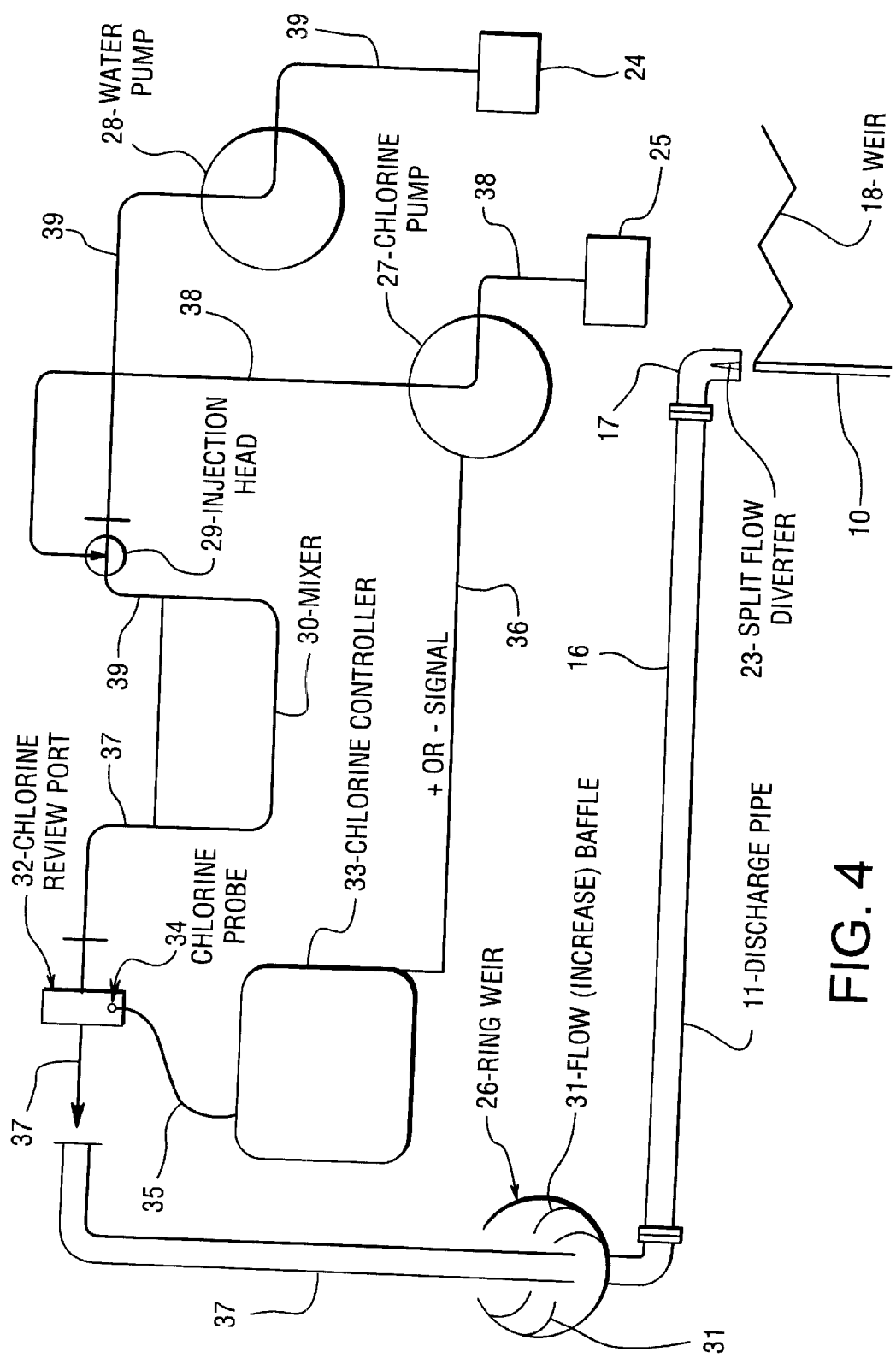
FIG. 4 is a partially schematic view of another embodiment of the rotating chemical distribution cleaning system of the invention.

A second, preferred embodiment of the rotating chemical distribution cleaning system is shown in FIG. 4. Existing clarifier 10 for waste (sewer) water can be, for example, a Dorr clarifier 11 installed in a circular tank. This embodiment differs from the first embodiment as specified below. Ring weir 26, instead of trough ring 15, is mounted on the top edge of clarifier baffle 20. Water is pumped (28) from water source 24 through pipe 39. Chlorine is pumped (27) from chlorine source (tank) 25 through pipe 38 and into pipe 39 via injector head 29. The water and the chlorine are mixed in mixer (e.g., enclosed mixing tank) 30 and the resultant aqueous chlorine solution is passed down pipe 37 into rotating ring weir 26. The chlorine concentration in the aqueous chlorine solution exiting mixer 30 is controlled by means of chlorine controller 33.

Chlorine probe 37 is installed in chlorine review port 37 in line 37 downstream from mixer 30. The electrical impulse is sent via electrical line 35 to chlorine controller 33 which has calculating means (module) which converts said electrical impulse into the chlorine concentration in the aqueous chlorine solution in line 37 and ascertains if the chlorine concentration is within the parameters of the desired (e.g., preset or adjustable as required) chlorine concentration values/range in the aqueous chlorine solution in line 37. If the calculated chlorine concentration is outside of the desired chlorine concentration value/range, an electrical adjustment signal is sent via line 36 to chlorine pump 36 which directs a pump speed control means (module) (not shown) to speed up or reduce the pumping speed of chlorine pump 36 to thereby convey more or less chlorine, respectively, to line 39. The exit end of pipe 37 extends into ring weir 26. Ring weir 26 has flow baffles 31 which increase the flow of aqueous chlorine solution into and through discharge pipe 16. The aqueous chlorine solution discharges through the downward end (17) of pipe 16 into existing clarifier weir 17. Split flow diverter 23 is an inverted V-shape cross bar mounted in the opening region of the downward end (17) of pipe 37, and causes the farming out of the exiting aqueous chlorine solution causing it to fall onto weir 17 (and its outfall surface) and down the inside of the clarifier tank wall.

The rotating chemical distribution cleaning system of the invention can be used with, for example, a Dorr clarifier installed in a square tank by designing the discharge pipe to be extendable and contractable to track the square trough ring or square weir ring.

NUMERAL IDENTIFICATION 10 clarifier
11 rotating chemical distribution cleaning system
12 valve
13 chemical solution feed line
14 air gap
15 rotating trough ring
16 chemical discharge line
17 point of discharge
18 existing clarifier weir
19 existing clarifier outfall surface
20 existing clarifier baffle
21 existing clarifier rake arm
22 existing clarifier drive shaft
23 split flow diverter
24 water supply
25 aqueous chlorine supply
26 ring weir
27 chlorine (solution) pump
28 water pump
29 injection head
30 mixer
31 flow (increase) baffle
32 chlorine review port
33 chlorine controller
34 chlorine probe
35 electrical line
36 electrical line
37 pipe
38 pipe
39 pipe

What is claimed is:

1. A rotating chemical cleaning system for a waste water clarifier mounted in a circular tank, the clarifier having a circular weir mounted on top edge of the circular tank, the weir having an outflow surface, rotatable means for supplying to an aqueous chemical solution to the weir and the outflow surface of the weir.

2. The system of claim 1 wherein the chemical in the aqueous chemical solution is chlorine.

3. The system of claim 1 wherein the rotatable means also supplies the aqueous chemical solution to inside surface of top edge region of the circular tank.

4. The system of claim 1 wherein the clarifier contains a rake arm which is rotatable around center axis of the circular tank, and the rotatable means includes a discharge pipe mounted on top of the rotatable rake arm and which discharges the aqueous chemical solution over the circular weir via an air gap or directly by water to water contact.

5. The system of claim 4 wherein the discharge end of the discharge pipe has an inverted V-slot on its underside end, or the discharge end of the discharge pipe is oriented downward and contains an inverted V-shaped cross bar.

6. The system of claim 4 wherein the clarifier has a central drive shaft and a central circular clarifier baffle rotated by the central drive shaft, a circular trough or a weir ring mounted on top edge of the central circular baffle, the circular trough or the weir ring flow communicates with the rotatable discharge pipe, and there is also supply means for delivering the aqueous chemical solution to the circular trough or the weir ring.

7. The system of claim 6 wherein there is further means for controlling chemical concentration in the aqueous chemical solution.

* * * * *